(12) United States Patent
Kikuchi et al.

(10) Patent No.: US 10,100,462 B2
(45) Date of Patent: Oct. 16, 2018

(54) SYNTHETIC-FIBER ROPE

(71) Applicants: OBAMA ROPE MFG., CO., LTD., Obama-shi (JP); ASHIMORI INDUSTRY CO., LTD., Osaka-shi (JP)

(72) Inventors: Yuzo Kikuchi, Setagaya (JP); Yoshihiro Kinoshita, Obama (JP); Toshiyuki Kosaka, Settsu (JP); Sosuke Morimoto, Settsu (JP)

(73) Assignees: OBAMA ROPE MFG., CO., LTD., Obama-shi (JP); ASHIMORI INDUSTRY CO., LTD., Osaka-shi (JP)

( * ) Notice: Subject to any disclaimer, the term of this patent is extended or adjusted under 35 U.S.C. 154(b) by 131 days.

(21) Appl. No.: 14/409,659

(22) PCT Filed: Oct. 23, 2013

(86) PCT No.: PCT/JP2013/078680
§ 371 (c)(1),
(2) Date: Dec. 19, 2014

(87) PCT Pub. No.: WO2014/069299
PCT Pub. Date: May 8, 2014

(65) Prior Publication Data
US 2015/0152594 A1    Jun. 4, 2015

(30) Foreign Application Priority Data

Oct. 29, 2012    (JP) .................................. 2012-237477

(51) Int. Cl.
*D07B 1/02*    (2006.01)
*A01K 75/00*    (2006.01)
(Continued)

(52) U.S. Cl.
CPC ................ *D07B 1/02* (2013.01); *A01K 75/00* (2013.01); *D03D 3/02* (2013.01); *D07B 1/16* (2013.01);
(Continued)

(58) Field of Classification Search
CPC ... D07B 1/02; D07B 1/04; D07B 1/16; D03D 3/02
See application file for complete search history.

(56) References Cited

U.S. PATENT DOCUMENTS 2,061,483 A    11/1936    Reed
3,805,667 A    4/1974    Orser
(Continued)

FOREIGN PATENT DOCUMENTS

CN    2467559 Y    12/2001
CN    201873895 U    6/2011
(Continued)

OTHER PUBLICATIONS

International Preliminary Report on Patentability and Written Opinion dated May 5, 2015 in PCT/JP2013/078680 (submitting English translation only).
(Continued)

*Primary Examiner* — Shaun R Hurley
(74) *Attorney, Agent, or Firm* — Oblon, McClelland, Maier & Neustadt, L.L.P.

(57) ABSTRACT

There is provided a high-tensile synthetic fiber rope having a low percentage elongation, the rope dramatically improving the strength utilization rate of the tensile strength of the synthetic fibers, and ensuring the percentage elongation approximately the same as the percentage elongation of the synthetic fibers used in the rope. The synthetic fiber rope includes a plurality of strands twisted or braided together, each of the strands including: a tubular woven fabric woven
(Continued)

with warp and weft yarns made of synthetic fibers; and a core material disposed in the tubular woven fabric, the core material being constituted by a plurality of parallel-bundled yarns made of the synthetic fibers in the tubular woven fabric.

6 Claims, 5 Drawing Sheets

(51) Int. Cl.
  *D03D 3/02* (2006.01)
  *D07B 1/16* (2006.01)
  *D07B 1/18* (2006.01)
  *D07B 1/14* (2006.01)
  *D07B 1/06* (2006.01)

(52) U.S. Cl.
  CPC .............. *D07B 1/025* (2013.01); *D07B 1/068* (2013.01); *D07B 1/145* (2013.01); *D07B 1/148* (2013.01); *D07B 1/185* (2013.01); *D07B 2201/104* (2013.01); *D07B 2201/1014* (2015.07); *D07B 2201/1096* (2013.01); *D07B 2201/209* (2013.01); *D07B 2201/2033* (2013.01); *D07B 2201/2087* (2013.01); *D07B 2201/20903* (2015.07); *D07B 2205/205* (2013.01); *D07B 2205/2014* (2013.01); *D07B 2205/2039* (2013.01); *D07B 2205/3007* (2013.01); *D07B 2205/3021* (2013.01); *D07B 2501/2038* (2013.01); *D07B 2501/2061* (2013.01)

(56) References Cited

U.S. PATENT DOCUMENTS

| | | | |
|---|---|---|---|
| 4,757,719 A | 7/1988 | Franke | |
| 4,789,045 A * | 12/1988 | Pugh | A62B 1/20 114/362 |
| 7,932,469 B1 * | 4/2011 | Shelton | F16L 11/02 174/117 M |
| 9,045,856 B2 | 6/2015 | Hachisuka et al. | |
| 2009/0218002 A1 | 9/2009 | Kashihara | |
| 2009/0272570 A1 * | 11/2009 | Chen | D02G 3/441 174/350 |
| 2011/0197564 A1 | 8/2011 | Zachariades et al. | |
| 2012/0260620 A1 | 10/2012 | Kim et al. | |
| 2013/0206275 A1 * | 8/2013 | Itoh | B60R 16/02 139/35 |
| 2013/0269308 A1 * | 10/2013 | Kurosawa | D07B 1/02 57/218 |
| 2014/0272218 A1 * | 9/2014 | Thomas | D02G 3/38 428/35.1 |
| 2014/0325954 A1 * | 11/2014 | Cevahir | D02G 3/16 57/200 |
| 2014/0373502 A1 * | 12/2014 | Cour | D02G 3/328 57/225 |
| 2015/0128792 A1 * | 5/2015 | Zachariades | D07B 1/04 87/6 |

FOREIGN PATENT DOCUMENTS

| | | |
|---|---|---|
| CN | 102465462 A | 5/2012 |
| CN | 102465463 A | 5/2012 |
| CN | 102465464 A | 5/2012 |
| CN | 102465465 A | 5/2012 |
| DE | 42 04 733 C1 | 6/1993 |
| EP | 0 286 711 A1 | 10/1988 |
| EP | 2 511 406 A2 | 10/2012 |
| EP | 2 573 257 A1 | 3/2013 |
| JP | 56-37391 | 4/1981 |
| JP | 2-48477 Y2 | 12/1990 |
| JP | 3-8878 | 1/1991 |
| JP | 3-53597 U | 5/1991 |
| JP | 10-338008 | 12/1998 |
| JP | 2000-228931 | 8/2000 |
| JP | 2001-103870 | 4/2001 |
| JP | 2002038386 A | 2/2002 |
| JP | 2009520659 A | 5/2009 |
| JP | S28-7685 Y | 8/2016 |

OTHER PUBLICATIONS

Extended European Search Report dated Jun. 13, 2016 in Patent Application No. 13850527.6.
Korean Office Action dated Nov. 19, 2015 in Patent Application No. 10-2014-7036319 (with Partial English Translation).
International Search Report dated Dec. 17, 2013, in PCT/JP2013/078680, filed Oct. 23, 2013.
Decision of Refusal dated May 19, 2016 in Korean Patent Application No. 10-2014-7036319 (with English language translation).
Japanese Office Action dated Feb. 28, 2017 for Japanese Application No. Tokugan No. 2013-148572 with English translation, 7 pages.
Combined Office Action and Search Report dated Nov. 27, 2015 in Chinese Patent Application No. 201380033417.1 (with partial English language translation and English Translation of Category of Cited Documents).

* cited by examiner

F IG.4(A)
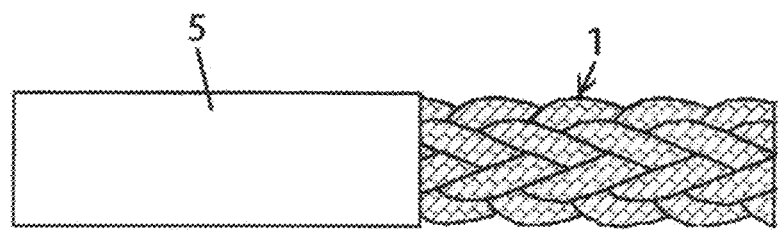
F IG.4(B)
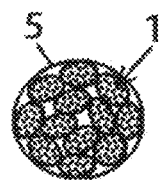

SYNTHETIC-FIBER ROPE

TECHNICAL FIELD

The present invention relates to a synthetic fiber rope. In particular, the present invention relates to a synthetic fiber rope formed of a plurality of strands twisted or braided together.

BACKGROUND ART

Conventional synthetic fiber ropes are generally formed as follows: a plurality of raw yarns are twisted in one or two twisting process(es) to produce yarns (twisted yarns); the thus produced yarns are paralleled and twisted, to produce strands (each strand is an aggregation of yarns); and then the strands are twisted or braided together to form a rope. In general, a rope formed of three strands twisted together is named a three-strand rope, and a rope formed of plaited (or braided) eight strands is named an eight-strand rope. Also, there are ropes each formed of plaited (or braided) strands of an even number such as twelve and sixteen. (See Patent Literatures 1 and 2)

The above-described strands include strands each having multiple synthetic fiber yarns functioning as a core material, and a tubular outer layer of a braided structure in which the core material is disposed. These strands can be twisted together to lay a rope. (See Patent Literature 3)

CITATION LIST

Patent Literature

Patent Literature 1: Japanese Unexamined Patent Publication No. 103870/2001 (Tokukai 2001-103870)
Patent Literature 2: Japanese Unexamined Patent Publication No. 228931/2000 (Tokukai 2000-228931)
Patent Literature 3: Japanese Laid-Open Utility Model Publication No. 53597/1991 (Jitsukaihei 3-53597)

SUMMARY OF INVENTION

Technical Problem

In the process of forming the above-described conventional rope, the yarns and the strands are twisted several times. Therefore, the percentage elongation of the rope increases, and the intrinsic tensile strength of the synthetic fibers is not fully utilized. In addition, the number of yarns constituting each strand increases with the increase in the nominal diameter of the rope, and therefore it is difficult for the yarns to have a uniform tensile strength. Thus, there have been problems such as a decrease in the utilization rate of the intrinsic tensile strength of the synthetic fibers (the proportion of the strength of the rope to the total tensile strength of the synthetic fibers, hereinafter may be simply referred to as a "strength utilization rate").

Solution to Problem

The present invention has been made to solve the above problems. An object of the present invention is to provide a synthetic fiber rope formed of a plurality of strands twisted or braided together, each of the strands including: a tubular woven fabric structured by warp and weft yarns made of synthetic fibers; and a core material disposed in the tubular woven fabric, the core material being constituted by a bundle of synthetic fiber yarns.

Advantageous Effects of Invention

The synthetic fiber rope of the present invention is formed of the strands twisted or braided together, each of the strands including a woven fabric structured by the warp and weft yarns made of the synthetic fibers. Therefore, the following functions and effects are provided.

1) The warp yarns of the tubular woven fabric and the core material are arranged to extend in the longitudinal direction of the rope, and therefore provided is the high-tensile rope having a low percentage elongation. Further, the strength utilization rate of the tensile strength of the synthetic fibers is dramatically improved, and ensured is the percentage elongation substantially the same as the percentage elongation of the synthetic fibers used in the rope.

2) Since the core material is restrained by the tubular woven fabric, it is easier to keep the shape of the rope stable, and it is possible to freely determine the lay length of the rope (the distance in which a strand makes one complete turn).

3) The present invention is suitable for producing a rope having a large nominal diameter.

BRIEF DESCRIPTION OF DRAWINGS

FIG. 4(A) is a diagram illustrating the structure of a jacketed synthetic fiber rope according to another embodiment, and FIG. 4(B) is an end view of the rope.

DESCRIPTION OF EMBODIMENTS

The following describes embodiments of the synthetic fiber rope of the present invention, with reference to the drawings.

Figure 1A:
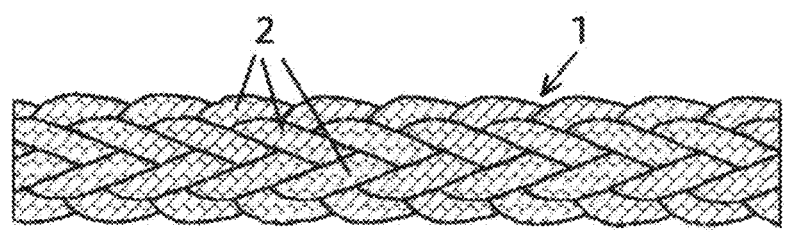
FIG. 1(A) is a diagram illustrating the structure of a synthetic fiber rope according to an embodiment of the present invention.
Figure 1B:
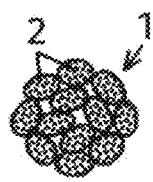
FIG. 1(B) is an end view of the synthetic fiber rope.

In FIG. 1, the reference sign "1" denotes the synthetic fiber rope, and the synthetic fiber rope is formed of a plurality of (twelve in this embodiment) strands 2 twisted together. When twisting the strands together, it is preferable not to contort each individual strand 2 to achieve a low percentage elongation; however, such a contortion shall not be excluded in the present invention. To prevent the contortion of each strand, the color of a part of the warp yarns of the tubular woven fabric of each strand may be differentiated to function as a tracer. The number of the above strands 2 twisted together is not limited to twelve as is in this embodiment. The number of the strands is properly determined depending on the field in which the rope is used, for example, in fishing industries, in ships and vessels, or on land, and/or depending on the type and/or fineness of the synthetic fibers used in the strands, for example. Further, the synthetic fiber rope 1 may include a core member made of synthetic fibers and/or metal wires at the center thereof.

Figure 2:
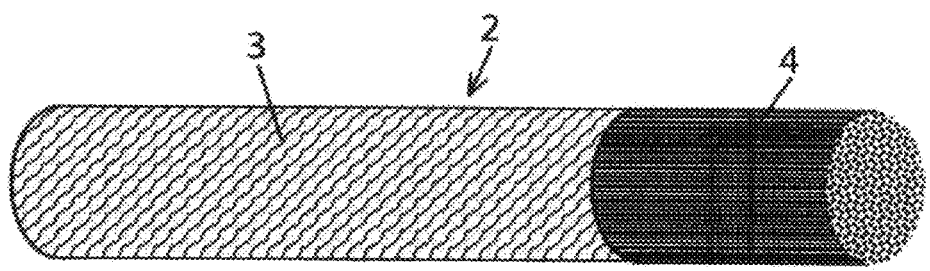
FIG. 2 is a diagram illustrating the structure of a strand shown in FIG. 1.

As can be seen from FIG. 2, each of the strands 2 includes: a tubular woven fabric 3 structured by warp and weft yarns made of synthetic fibers; and a core material 4 disposed in the tubular woven fabric 3, the core material 4 being constituted by a bundle of synthetic fiber yarns. Examples of the synthetic fibers include polyamide fibers such as nylon, polyester fibers, polyacrylonitrile fibers, polyvinyl alcohol fibers such as vinylon, polypropylene fibers, polyvinyl chloride fibers, polyethylene fibers, polyvinylidene chloride fibers, and polyurethane fibers. In terms of the strength and the elongation to withstand a high tensile force, synthetic fibers with a high strength and a low percentage elongation are preferable, such as the polyester fibers, as well as ultrahigh molecular weight polyethylene, aramid fibers, polyallylate fibers, carbon fibers, and metal wires. Further, the weave of the tubular woven fabric may be a plain weave or a twill weave, for example, and may be appropriately selected from the weaves capable of forming a tubular shape.

Figure 3:
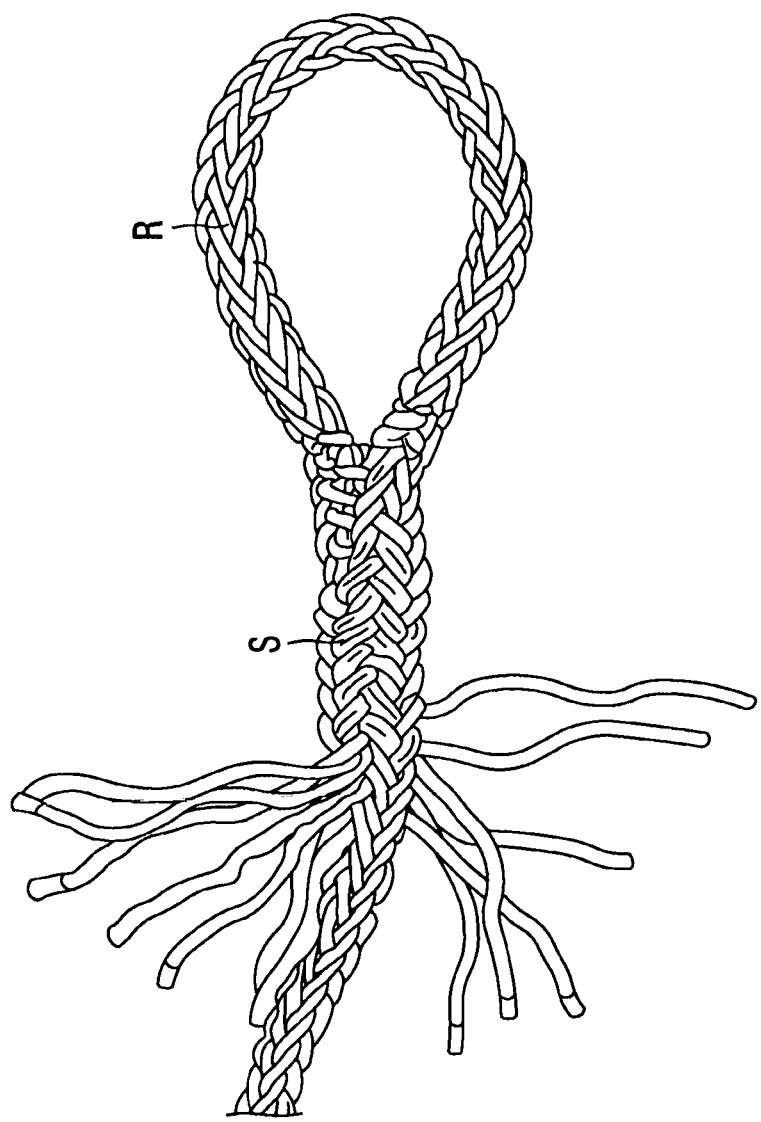
FIG. 3 is a picture showing the structure of a synthetic fiber rope according to another embodiment in which an eye splice is formed at an end of the rope to form a loop.

FIG. 3 shows a synthetic fiber rope according to another embodiment in which an eye splice S is formed at an end of the rope to form a loop R. Compared with conventional strands each having a braided-structure layer, the strands in the present invention each having a woven-structure layer structured by the warp and the weft yarns have low elongation and are less slippery, and therefore the firm loop R is formed.

FIG. 4 shows a synthetic fiber rope covered with a jacket 5, according to another embodiment. The jacket 5 may be any of the followings: a thin film of a synthetic resin, a braided-structure jacket formed of braided synthetic fiber yarns, and a woven-structure jacket similar to the tubular woven fabric.

Specific Examples of the Present Invention

Now, specific examples of the present invention will be described with reference to Table 1.

TABLE 1

(Tubular plain weave fabric structured by warp and weft yarns is used in each strand. Test method is in accordance with JIS-L-2707.)

|  | 8- strand polyester rope | 12- strand polyester rope |
|---|---|---|
| Nominal diameter | 36 mm | 45 mm |
| Raw yarn | Polyester multifilament 1500d | |
| Yarn structure | (Warp) core: 3, cover: 4 | |
| Number of yarns per strand | (Warp) core: 103 + cover: 40, woven fabric | |
| Number of strands | 8 | 12 |
| Measured tensile strength | 345 kN | 534 kN |
| Mass of rope/200 m | 183 kg | 262 kg |
| Total fineness of used synthetic fibers | 5,628,000d | 8,442,000d |
| Strength utilization rate | 69.4% | 71.7% |

*Strength utilization rate was calculated based on the strength of polyester raw yarns, 9 g/d.

Referring to Table 1, as for an eight-strand rope in which polyester filaments (1500 d) are used as synthetic fiber raw yarns, the measured tensile strength was 345 kN, and the strength utilization rate was 69.4%. As for a twelve-strand rope, the measured tensile strength was 534 kN, and the strength utilization rate was 71.7%.

(Examples of Existing Technique)

Table 2 shows data of examples according to an existing technique, for comparison with the above specific examples of the present invention.

TABLE 2

(Production method and test method are in accordance with JIS-L-2707)
8- strand polyester rope

| Nominal diameter | 18 mm | 28 mm | 36 mm |
|---|---|---|---|
| Raw yarn | Polyester multifilament 1500d | | |
| Yarn structure | 4 × 3 | 6 × 3 | 6 × 3 |
| Number of yarns per strand | 12 | 18 | 30 |
| Number of strands | 8 | | |
| Standardized tensile strength | 46.7 kN | 106 kN | 170 kN |
| Measured tensile strength | 61.0 kN | 121 kN | 187 kN |
| Mass of rope/200 m | 50 kg | 121 kg | 200 kg |
| Total fineness of used synthetic fibers | 1,728,000d | 3,888,000d | 6,480,000d |
| Strength utilization rate | 40% | 35.3% | 32.7% |

Referring to Table 2, as for an eight-strand rope in which polyester filaments (1500 d) are used as synthetic fiber raw yarns, the measured tensile strength was in the range from 61.0 kN (diameter: 18 mm) to 187 kN (diameter: 36 mm), and the strength utilization rate was in the range from 40% to 32.7%.

(Comparison Between the Existing Technique and the Proposed New Technique)

Next, the advantages of the present invention will be described, comparing the proposed new technique with the existing technique.

TABLE 3

(Both ropes are 8-strand ropes having nominal diameter of 36 mm)

|  | Existing technique (in accordance with JIS) | New technique |
|---|---|---|
| Nominal diameter | 36 mm | 36 mm |
| Raw yarn | Polyester multifilament 1500d | |
| Number of strands | 8 | 8 |
| Measured tensile strength | 187 kN | 345 kN |
| Mass of rope/200 m | 200 kg | 183 kg |
| Total fineness of used synthetic fibers | 6,480,000d | 5,628,000d |
| Strength utilization rate | 32.7% | 69.4% |
| Strength utilization rate comparison | Regarded as 100% | 212% |
| Tensile strength comparison | Regarded as 100% | 184.5% |
| Strength per mass comparison | Regarded as 100% | 201.6% |

As apparent from Table 3, under the same condition that the nominal diameter is 36 mm and that the number of the strands is eight, the strength utilization rate of the synthetic fiber rope of the proposed new technique (the present invention) is 2.12 times as large as that of the existing technique (69.4%/32.7%), and the tensile strength of the new technique is 1.84 times as large as that of the existing technique. This shows the excellence of the rope of the present invention. Further, it was found that the synthetic fiber rope of the proposed new technique (the present invention) achieves the weight saving of approximately 8%, compared with that of the existing technique under the condition of the same nominal diameter.

Each of the strands in the present invention includes the tubular woven fabric structured by the warp and weft yarns made of the synthetic fibers, and the core material disposed in the tubular woven fabric, the core material being constituted by the bundle of synthetic fiber yarns. Therefore the strands are good in shape retention. Accordingly, its usefulness is not lost even when the lay length of the rope is increased.

Figure 5:
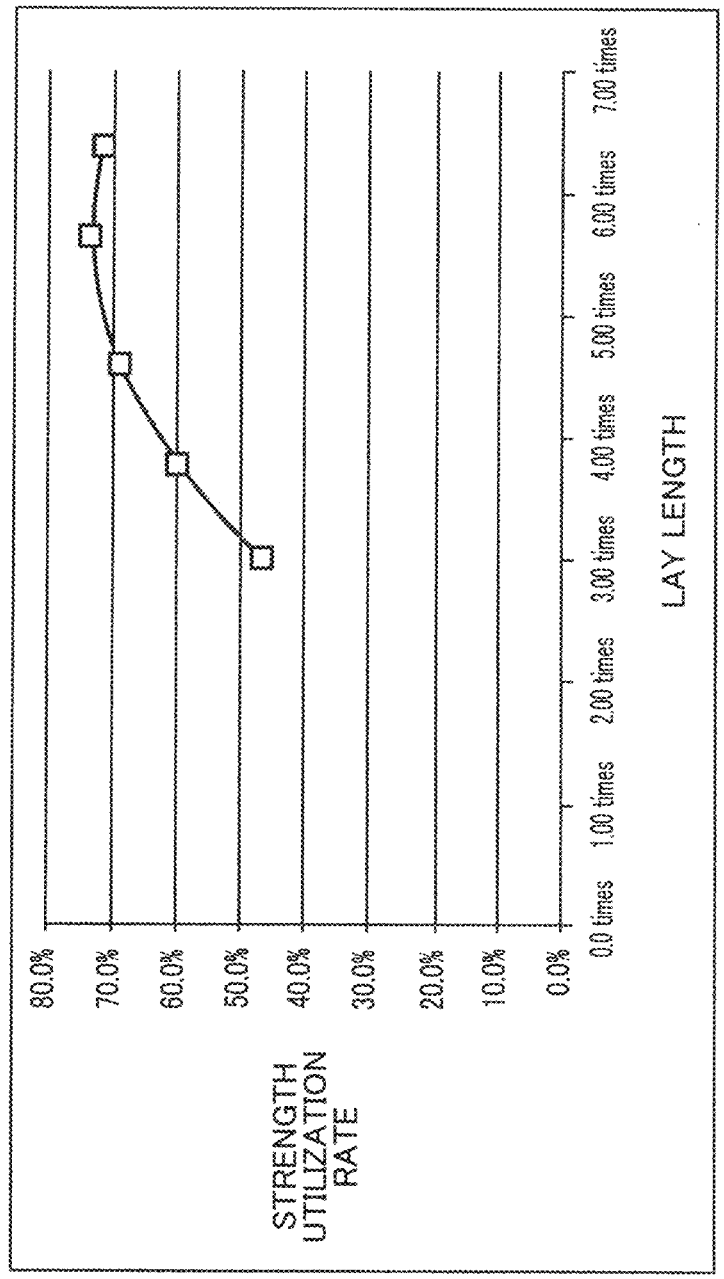
FIG. 5 is a graph showing the relationship between the lay length and the strength utilization rate, plotted based on test data.

Table 4 shows test data indicating how the breaking strength and the strength utilization rate of the rope changes with the change in the lay length of the rope. For the ropes of which lay lengths are 3.00, 3.78, 4.58, 5.64, and 6.39 (times), respectively, the breaking strengths were 236, 305, 352, 376, and 366 (kN), respectively, and the strength utilization rates were 46.3, 59.8, 69.0, 73.7, and 71.8(%), respectively. The relationship between the lay length and the strength utilization rate (%) was plotted into the graph of FIG. 5, which shows that the strength utilization rate (%) is the maximum when the lay length is on the order of 5.6 times. The strength utilization rate of a rope formed of general strands is approximately 30% to 40%. Therefore, the strength utilization rate of 73.7% in the data is very high.

Generally, if the lay length of a rope is increased as is in the above, the shape of each strand cannot be retained possibly, and therefore a problem in use may be caused, such as deterioration of the wear and abrasion resistance. (Accordingly, it is stipulated in JIS (Japanese Industrial Standards) that the lay length of the eight strand rope, for example, shall be not more than 3.5 times the nominal diameter.)

However, in the present invention, the core material is disposed in the tubular woven fabric. Therefore the shape of each strand is retained, and it is possible to increase the lay length to the length more than 3.5 times the nominal diameter. Thus, by optimizing the lay length of the rope, the high strength utilization rate (73.7%) was obtained, as shown in Table 4.

fabric. The tubular woven fabric woven by the circular loom is seamless, different from that woven by the plain weave loom. Therefore, in addition to the increase in the strength of the tubular woven fabric in the circumferential direction, the following advantages are provided. (1) Because the tubular woven fabric is seamless (there is no unevenness), the weave of the tubular woven fabric is uniform, and its wear and abrasion resistance is improved. (2) Because the tubular woven fabric is seamless, it can be flexibly bent in all directions, and there is no bending tendency. (3) Because the tubular woven fabric is seamless, the elongation in the longitudinal direction of the strands is uniform, and therefore the strength is improved. (4) When the strength in the circumferential direction to be achieved is the same, the number of weft yarns woven into the fabric is smaller, and therefore flexible strands are provided. (5) Because the number of the weft yarns woven into the fabric is decreased, the percentage of the warp yarns in the fiber level of the entire rope increases, which further improves the strength utilization rate.

Furthermore, in any of the above-listed looms, a tracer may be woven into the tubular woven fabric 3 by differentiating the color of a part of the warp yarns of the tubular woven fabric 3 from the other warp yarns. This brings about an advantage that it is possible to check the contortion of each strand 2, which makes it easier to distinguish the less

TABLE 4

Evaluation result of belt strand plaited rope (8-strand rope, 36 mm)

| Sample | Diameter under reference tension | Lay length under reference tension | Percentage elongation (from reference tension to 128 kN) | Breaking strength | Utilization rate | Number of broken strands | Number of tucks in eye splice | Slipperiness |
|---|---|---|---|---|---|---|---|---|
| 1) Rope having lay length of 3.00 times | 36.0 mm | 3.00 times | 14.29% | 236 kN | 46.3% | 4 | 3 | No |
| 2) Rope having lay length of 3.78 times | 35.0 mm | 3.78 times | 8.74% | 305 kN | 59.8% | 6 | 3 | Yes |
| 3) Rope having lay length of 4.58 times | 36.0 mm | 4.58 times | 7.77% | 352 kN | 69.0% | 4 | 4 | Yes |
| 4) Rope having lay length of 5.64 times | 35.7 mm | 5.64 times | 6.91% | 376 kN | 73.7% | 6 | 5 | No |
| 5) Rope having lay length of 6.39 times | 36.0 mm | 6.39 times | 6.89% | 366 kN | 71.8% | 2 | 5 | No |

<Polyester multifilament 36 mm rope in accordance with JIS-L-2707>
Reference tension: 1.47 kN
Percentage elongation: not more than 40% (from 1.47 kN to 128 kN)
Breaking strength: not less than 170 kN The weave of the tubular woven fabric 3 structured by the warp and weft yarns may be any of the generally known weaves, such as a plain weave and a twill weave. In particular, the twill weave is advantageous in that: the warp yarns are less restrained; a high tensile strength is provided; and flexibility is imparted to the strands.

The tubular woven fabric 3 may be woven using a shuttle loom, a needle loom, or a circular loom. When using a plain weave loom such as the shuttle loom and the needle loom, a weft yarn on a shuttle or a needle is passed between the warp yarns moved so as to be opened and closed alternately, to weave a plain weave fabric, and then the plain weave fabric is formed into a tubular shape by sewing the both ends of the fabric with another thread, or by whipstitching the both ends with the weft yarn on the needle.

Further, the circular loom is a loom in which the warp yarns are radially supplied from an outer circumferential portion of the loom, and the weft yarns are revolvingly moved in the circumferential direction thereby to weave a contorted strands 2. The less contorted strands are preferable since the strength is decreased if the strand is contorted.

INDUSTRIAL APPLICABILITY

The synthetic fiber rope of the present invention has a high tensile strength and the percentage elongation approximately the same as that of the synthetic fibers, and the synthetic fiber rope can be used as a substitute rope in the fields where wire ropes have been conventionally used, for example, in the fishing industries, in ships and vessels, or on land.

REFERENCE SIGNS LIST 1 synthetic fiber rope
2 strand
3 tubular woven fabric
4 core material

5 jacket
R loop
S eye splice

The invention claimed is:

1. A synthetic fiber rope comprising:
a plurality of strands twisted or braided together, each of the strands including: a tubular woven fabric woven with warp and weft yarns made of synthetic fibers; and a core material disposed in the tubular woven fabric, an entire periphery of the core material being in contact with the tubular woven fabric,
wherein the core material in the tubular woven fabric is constituted by a plurality of parallel yarns made of synthetic fibers,
wherein warp yarns of the tubular woven fabric and the core material are arranged to extend in a longitudinal direction of the rope,
wherein a tracer is woven into the tubular woven fabric by differentiating the color of a part of the warp yarns of the tubular woven fabric from that of the other warp yarns, and
wherein the plurality of strands are twisted or braided together without contorting each of the strands.

2. The synthetic fiber rope according to claim 1, wherein the synthetic fibers of the tubular woven fabric and the core material are a single type of or plural types of fibers selected from the group consisting of polyamide fibers, polyester fibers, polyacrylonitrile fibers, polyvinyl alcohol fibers, polypropylene fibers, polyvinyl chloride fibers, polyethylene fibers, polyvinylidene chloride fibers, and polyurethane fibers.

3. The synthetic fiber rope according to claim 1, wherein an outer circumferential surface of the rope is covered with a jacket, the jacket being a thin film of a synthetic resin, a braided-structure jacket formed of braided synthetic fiber yarns, or a woven-structure jacket similar to the tubular woven fabric.

4. The synthetic fiber rope according to claim 1, wherein each of the strands is produced using a circular loom.

5. The synthetic fiber rope according to claim 1, wherein the rope is used as a rope for a fishing net or a rope for mooring ships, and used for securing an offshore structure or an underwater offshore structure.

6. The synthetic fiber rope according to claim 1, wherein a lay length is at least 3.5 times longer than a nominal diameter.

* * * * *